United States Patent
Tweedy (10) Patent No.: US 12,270,501 B2
(45) Date of Patent: Apr. 8, 2025

(54) THREADED TUBULAR END PROTECTOR

(71) Applicant: Tweedy's Speed Protectors, LLC, Eufaula, OK (US)

(72) Inventor: Neil E. Tweedy, Henryetta, OK (US)

(73) Assignee: Tweedy's Speed Protectors, LLC, Eufaula, OK (US)

( * ) Notice: Subject to any disclaimer, the term of this patent is extended or adjusted under 35 U.S.C. 154(b) by 270 days.

(21) Appl. No.: 17/817,756

(22) Filed: Aug. 5, 2022

(65) Prior Publication Data

US 2022/0373124 A1 Nov. 24, 2022

Related U.S. Application Data

(63) Continuation-in-part of application No. 17/718,015, filed on Apr. 11, 2022, now Pat. No. 11,473,715,
(Continued)

(51) Int. Cl.
*F16L 57/00* (2006.01)

(52) U.S. Cl.
CPC .................. *F16L 57/005* (2013.01)

(58) Field of Classification Search
CPC .......... F16L 35/00; F16L 57/00; F16L 57/005
(Continued)

(56) References Cited

U.S. PATENT DOCUMENTS

| | | |
|---|---|---|
| 676,976 A | 6/1901 | Bossert |
| 1,457,882 A | 6/1923 | Shrum |

(Continued)

FOREIGN PATENT DOCUMENTS

| | | |
|---|---|---|
| DE | 2840742 A1 | 3/1980 |
| FR | 1237248 A | 7/1960 |

OTHER PUBLICATIONS

PCT/US2021/039400; "International Search Report and Written Opinion"; mailed Oct. 6, 2021; 10 pages.
(Continued)

*Primary Examiner* — Patrick F Brinson
(74) *Attorney, Agent, or Firm* — Hall Estill Law Firm (57) ABSTRACT

A thread protector that includes an end cap for engaging with a pin end or box end of a tubular member and a securing apparatus extending from the end cap to frictionally engage an inner side of the tubular member to maintain the thread protector's engagement with the tubular member. The securing apparatus includes a plurality of leg assemblies to engage the inside of the tubular member. The thread protector also includes a bolt extending through an opening in the end cap that actuates the leg assemblies when the bolt is turned. Another thread protector that includes a cup end for engaging with a pin end or box end of a tubular member and the cup end has an end plate. The thread protector also includes a protective sleeve extending from the end plate of the cup end outside of the tubular member wherein the protective sleeve has inner threads disposed on an inside part. The thread protector further includes a releasable sleeve selectively securable around the tubular member with outer threads disposed on an outside portion whereby the outer threads on the releasable sleeve can engage the inner threads on the protective sleeve. A method of protecting pin threads of pin ends of tubular members. The method includes installing a thread protector on a pin end or a box end of a tubular member to protect threads disposed on the pin end or the box end of the tubular member.

6 Claims, 12 Drawing Sheets

Related U.S. Application Data which is a continuation-in-part of application No. 17/517,303, filed on Nov. 2, 2021, now Pat. No. 11,454,344, which is a continuation-in-part of application No. 17/360,641, filed on Jun. 28, 2021, now Pat. No. 11,313,503.

(60) Provisional application No. 63/045,317, filed on Jun. 29, 2020.

(58) Field of Classification Search
USPC .......................................... 138/96 T; 220/288
See application file for complete search history.

(56) References Cited

U.S. PATENT DOCUMENTS

| | | | |
|---|---|---|---|
| 1,600,860 A | 9/1926 | Young | |
| 1,639,814 A | 8/1927 | Shrum | |
| 1,692,710 A | 11/1928 | Spahn | |
| 1,774,569 A | 9/1930 | Shrum | |
| 1,785,985 A | 12/1930 | Shrum | |
| 2,156,169 A | 4/1939 | Unke | |
| 2,512,169 A | 6/1950 | Nachtigal | |
| 2,670,799 A | 3/1954 | Dobbs | |
| 2,810,401 A | 10/1957 | Stansbury | |
| 2,898,944 A | 11/1959 | Seward et al. | |
| 2,977,993 A | 4/1961 | Scherer | |
| 3,087,512 A | 4/1963 | Hickman et al. | |
| 3,744,528 A | 10/1973 | Vestal | |
| 4,036,261 A | 7/1977 | Hauk | |
| 4,185,665 A | 1/1980 | Flimon | |
| 4,210,179 A | 7/1980 | Galer | |
| 4,248,271 A | 2/1981 | Burgess | |
| 4,337,799 A * | 7/1982 | Hoover | B65D 59/06 902/31 |
| 4,733,888 A | 3/1988 | Toelke | |
| 5,148,835 A | 9/1992 | Clark | |
| 5,303,743 A | 4/1994 | Vincent | |
| 5,706,860 A | 1/1998 | Gonyea | |
| 6,196,270 B1 | 3/2001 | Richards et al. | |
| 9,151,432 B1 | 10/2015 | Yoder | |
| 9,546,029 B1 | 1/2017 | Keevert | |
| 9,631,666 B1 | 4/2017 | Colford | |
| 2005/0166986 A1 | 8/2005 | Dell'Erba et al. | |
| 2006/0266428 A1 * | 11/2006 | Pajaro Gonzalez | F16L 57/005 138/96 T |
| 2009/0050230 A1 * | 2/2009 | Heritier | F16L 57/005 138/96 T |
| 2014/0261849 A1 | 9/2014 | Danneffel et al. | |
| 2015/0034197 A1 | 2/2015 | Schneider et al. | |
| 2016/0039585 A1 | 2/2016 | Danneffel et al. | |
| 2019/0368281 A1 | 12/2019 | Haggart | |
| 2022/0057033 A1 | 2/2022 | Tweedy | |

OTHER PUBLICATIONS

PCT/US2021/059821; "International Search Report and Written Opinion"; mailed Mar. 24, 2022; 13 pages.

PCTUS20224044396; International Search Report and Written Opinion; mailed Feb. 8, 2023; 16 pages.

* cited by examiner

THREADED TUBULAR END PROTECTOR

CROSS-REFERENCE TO RELATED APPLICATIONS

The present application is a continuation-in-part application of U.S. Patent Application having U.S. Ser. No. 17/718,015, filed Apr. 11, 2022, which is a continuation-in-part application of U.S. Patent Application having U.S. Ser. No. 17/517,303, filed Nov. 2, 2021, which is a continuation-in-part application of U.S. Patent Application having U.S. Ser. No. 17/360,641, filed Jun. 28, 2021, which is a conversion of U.S. Provisional Application having U.S. Ser. No. 63/045,317, filed Jun. 29, 2020, which claims the benefit under 35 U.S.C. 119(e). The disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Disclosure

The present disclosure relates to a thread protector for a threaded end of a unit of casing or tubing that can be quickly attached to and removed from the unit of casing or tubing. The present disclosure also relates to a method of attaching or removing the thread protectors from the pin end of the units of casing or tubing.

2. Description of the Related Art

Casing and/or tubing have a pin end and a box end. The box end includes threads inside, which are naturally protected by being disposed inside the tubing or casing. The pin end has threads on the outside of the tubing or casing that are exposed and can be damaged. Currently, there are protective devices for the pin end threads of the tubing or casing but they take a considerable amount of time to put on the tubing or casing and remove from the tubing or casing. When you multiply the time it takes to put on or remove a typical protector device from the pin end threads of multiple units of tubing or casing, it results in a large amount of time. This large amount of time is taken directly from production time of an oil or gas well.

Accordingly, there is a need for a thread protector for the threads of the pin end of the tubing or casing that can be more quickly placed on and/or removed from the pin end of the tubing or casing, but still protects all the threads of the pin end of the tubing or casing.

SUMMARY OF THE DISCLOSURE

The present disclosure is directed toward a thread protector that includes an end cap for engaging with a pin end or box end of a tubular member. The thread protector includes a securing apparatus extending from the end cap to frictionally engage an inner side of the tubular member to maintain the thread protector's engagement with the tubular member. The securing apparatus includes a plurality of leg assemblies to engage the inside of the tubular member. The thread protector also includes a bolt extending through an opening in the end cap that actuates the leg assemblies when the bolt is turned.

The present disclosure is also directed toward a thread protector that includes a cup end for engaging with a pin end or box end of a tubular member and the cup end has an end plate. The thread protector also includes a protective sleeve extending from the end plate of the cup end outside of the tubular member wherein the protective sleeve has inner threads disposed on an inside part. The thread protector further includes a releasable sleeve selectively securable around the tubular member with outer threads disposed on an outside portion whereby the outer threads on the releasable sleeve can engage the inner threads on the protective sleeve.

The present disclosure is also directed toward a method of protecting pin threads of pin ends of tubular members. The method includes installing a thread protector on a pin end or a box end of a tubular member to protect threads disposed on the pin end or the box end of the tubular member.

DETAILED DESCRIPTION OF THE DISCLOSURE

The present disclosure is directed to a thread protector 10 to guard or protect threads 12 on a pin end 14 or internal threads 22 of a box end 15 of a tubular member 16. The tubular member 16 can be casing or tubing used in an oil and gas operation. The tubular member 16 includes an internal side 18 and an external side 20. The box end 15 of the tubular member 16 includes the internal threads 22 disposed therein on the internal side 18 of the tubular member 16. The threads 12 disposed on the external side 20 of the pin end 14 of the tubular member 16 can be a certain number of threads or extend along a certain length of the tubular member 16. The thread protectors disclosed herein can be designed such that all engagement areas between the thread protector and the tubular member 16 (pin end 14 or box end 15) can be on an unthreaded portion of the tubular member 16.

Referring now to FIGS. 1A-1D, the thread protector 10 includes an end cap 24 that can engage with an end 26 (pin end 14 or box end 15) of the tubular member 16. The end cap 24 can have a bolt opening 28 for receiving a bolt 30 that can engage with a securing apparatus 32 that can extend inside the tubular member 16 from the end cap 24. In one embodiment, the thread protector 10 can also include an external sleeve 34 that extends from the end cap 24 to protect the threads 12 on the pin end 14 of the tubular member 16. The external sleeve 34 can be sized to fit around the external side 20 of the tubular member 16 and have a length that is at least as long as the length of the threads 12 disposed on the pin end 14 of the tubular member 16. The external sleeve 34 can have an inner side 36, an outer side 38, a first end 40, and a second end 42. The external sleeve 34 is not needed for box ends 15 of tubular members 16 because the threads are on the inside.

The securing apparatus 32 can engage with the inside of the tubular member 16 to maintain position of the thread protector 10 relative to the threads 12 or 22 of the pin end 14 and box end 15 of the tubular member 16, respectively. The securing apparatus 32 can have any size and shape such that it maintains the thread protector 10 in place on the tubular member 16. In one embodiment, the securing apparatus 32 can include a plurality of leg assemblies 44 that extend from the end cap 24 to engage the internal side 18 of the tubular member 16 and a driving plate 46 that is threadedly engaged with the bolt 30. The leg assemblies 44 are also operationally linked to the driving plate 46 so that the leg assemblies 44 are moved when the driving plate 46 is moved. The driving plate 46 is moved toward and away from the end cap 24 depending on the direction the bold 30 is turned. The securing apparatus 32 can be designed such that the leg assemblies 44 can engage the internal side 18 of the tubular member 16 when the driving plate 46 is moved away from the end cap 24 or the securing apparatus 32 can be designed such that the leg assemblies 44 can engage the internal side 18 of the tubular member 16 when the driving plate 46 is moved toward the end cap 24. The driving plate 46 can have any shape (e.g., round, square, etc.) such that it can engage with the leg assemblies 44 in the desired manner.

In a further embodiment of the present disclosure, the thread protector 10 can include an inner sleeve 48 for protecting the leg assemblies 44 when they are not engaging the internal side 18 of the tubular member 16. The inner sleeve 18 can be releasably secured to the end cap 24 so that various sized inner sleeves 18 or various sized end caps 24 can be implemented depending on the size of the tubular member 16 the thread protector 10 will be used on. The inner sleeve 48 can include slots 50 disposed therein to allow the leg assemblies 44 to move from inside the inner sleeve 48 toward the internal side 18 of the tubular member 16 to contact the internal side 18 of the tubular member 16 to secure the thread protector 10 to the tubular member 16. The slots 50 also permit the leg assemblies 44 to move from engaging the internal side 18 of the tubular member 16 to back inside the inner sleeve 48. The slots 50 can be any length in the side of the inner sleeve 48 such that the leg assemblies 44 can move through without hindrance. In one embodiment, the slots 50 can extend through a terminal end 52 of the inner sleeve 48 so that longer leg assemblies 44 can be incorporated. The inner sleeve 48 can be used with any of the embodiments disclosed herein. Any of the thread protectors 10 disclosed herein can have multiple leg assemblies 44. In one embodiment, the thread protectors 10 can include three or more leg assemblies 44. If an inner sleeve 48 is used in a particular thread protector 10, the inner sleeve 48 will have the same number of slots 50 therein as the number of leg assemblies 44.

The inner sleeve 48 can be releasably secured to the end cap 24 in any manner known in the art for releasably securing one mechanical element to another. For example, the inner sleeve 48 could be screwed into/onto the end cap 24, the inner sleeve 48 could be secured to the end cap 24 via forced frictional engagement, etc. In one embodiment, an engagement end 54 of the inner sleeve 48 can have protrusions 56 extending therefrom that can engage with cavities 58 disposed in the end cap 24. The protrusions 56 can fit up inside the cavities 58, the inner sleeve 48 can be turned wherein parts of the protrusions 56 engage with parts of the cavities 58 to secure the inner sleeve 48 in place relative to the end cap 24. The engagement end 54 of the inner sleeve 48 can be a plate 60 with an opening disposed therein to permit the bolt 30 to extend therethrough.

The leg assemblies 44 can have various designs such that appropriate force could be applied to the internal side 18 of the tubular member 16 by the leg assemblies 44 to secure the thread protector 10 to the tubular member 16. Each leg assembly 44 can include a first leg portion 62 that can be hingedly or rigidly attached to the plate 60 of the inner sleeve 48 or to the end cap 24. In one embodiment shown more specifically in FIGS. 1A-1D, each leg assembly 44 can include a driver leg 64 that is hingedly attached to the driving plate 46 on one end and hingedly attached to the first leg portion 62 on the other end. The driver leg 64 forces the first leg portion 62 outward to cause a terminal end 63 of the first leg portion 62 to engage with the internal side 18 of the tubular member 16 when the bolt 30 is turned such that the driving plate 46 is driven inwards in the tubular member 16 in an axial direction. As the first leg portion 62 is driven more and more into the internal side 18 of the tubular member 16, first leg portions 62 are flexed and the outer side 65 of the first leg portions 62 then become engaged with the internal side 18 of the tubular member 16.

Conversely, when the bolt 30 is turned the other direction, the driver leg 64 pulls the first leg portion 62 inward towards the bolt 30 and disengages the first leg portions 62 from the internal side 18 of the tubular member 16. The driver legs 64 can be attached to the first leg portions 62 and the driving plate 46 in any manner known in the art that would permit hinged movement therebetween. In one exemplary embodiment, each end of the driver legs can have a ring member that encircles a part of the first leg portion 62 and the driving plate 46, respectively.

Figure 1A:
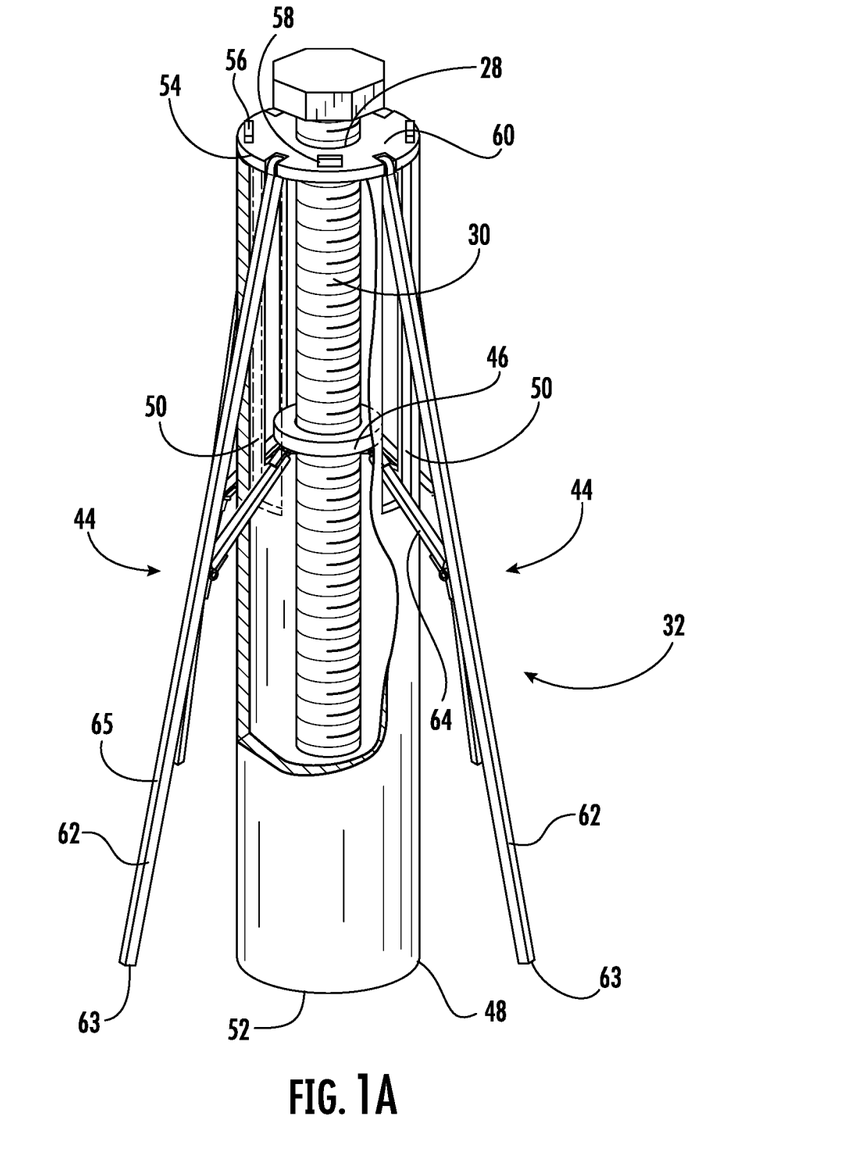
FIGS. 1A-1D show various views of a thread protector constructed in accordance with the present disclosure.
Figure 1B:
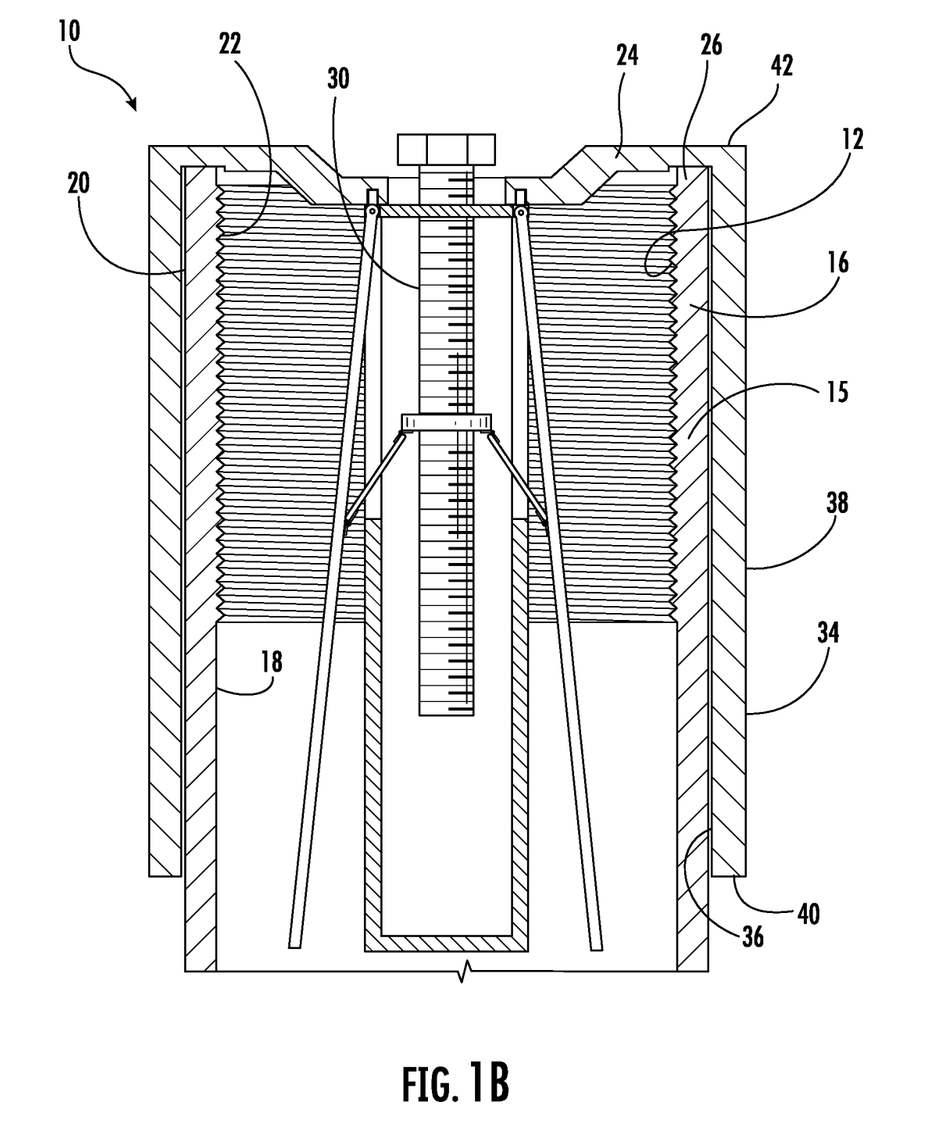
Figure 1C:
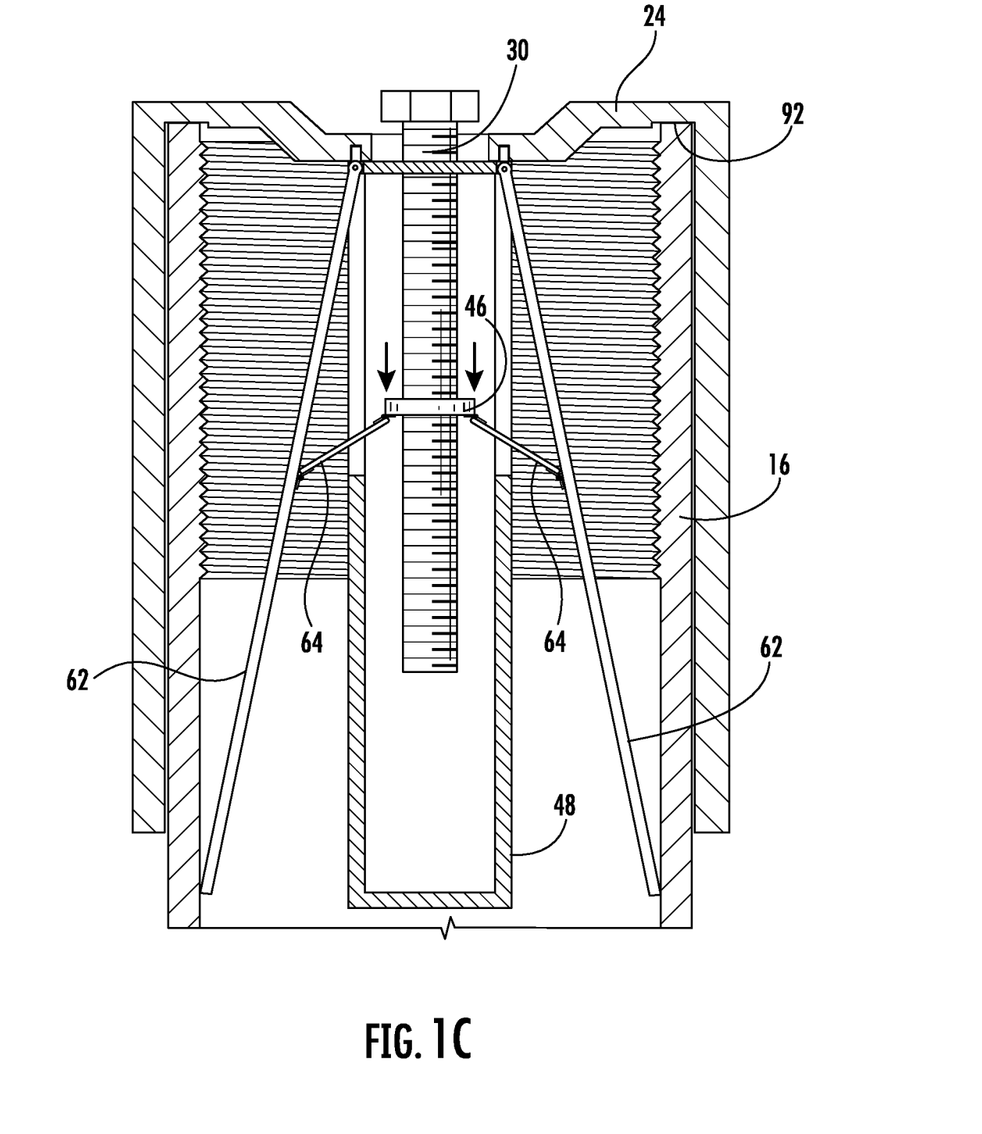
Figure 1D:
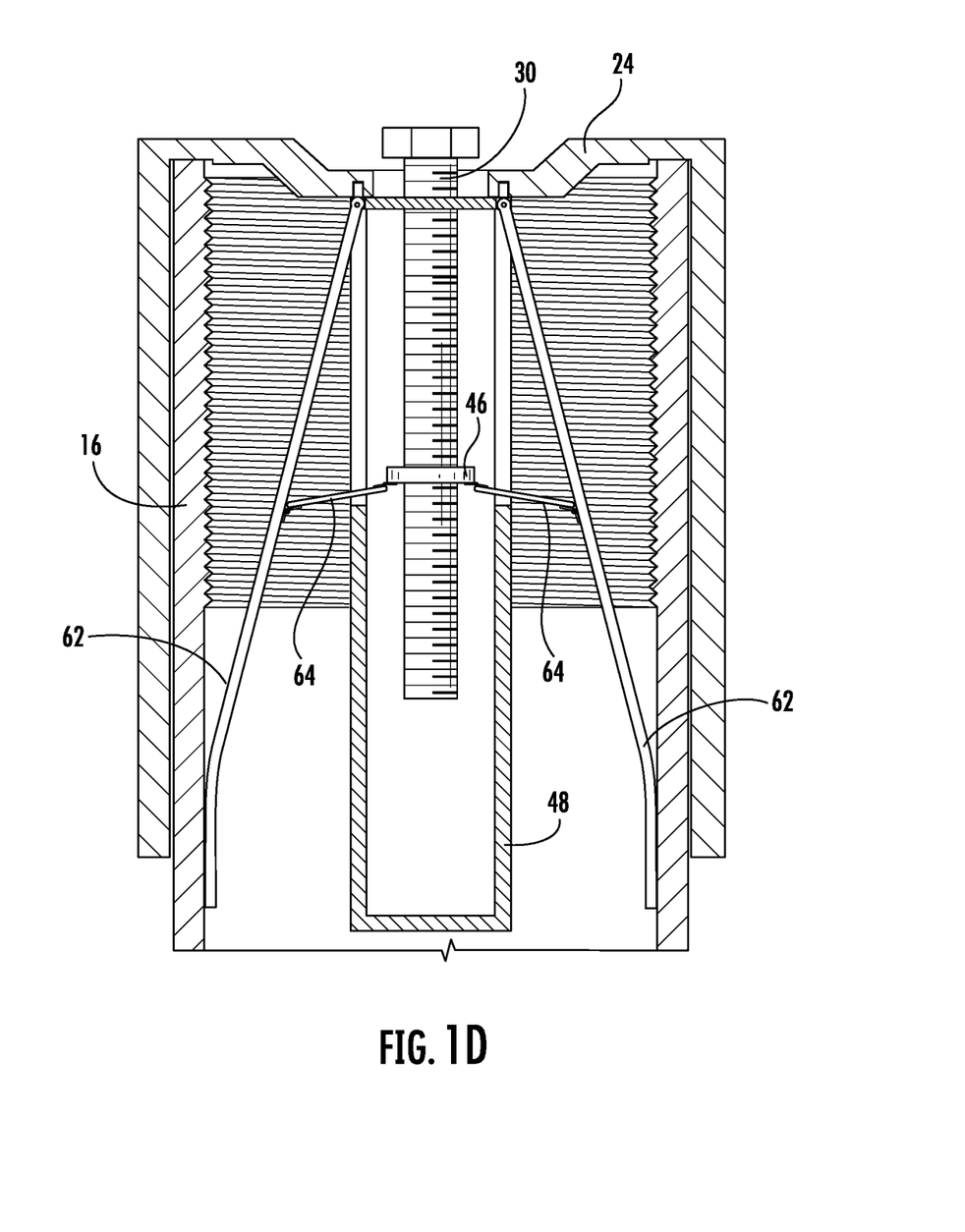
Figure 2A:
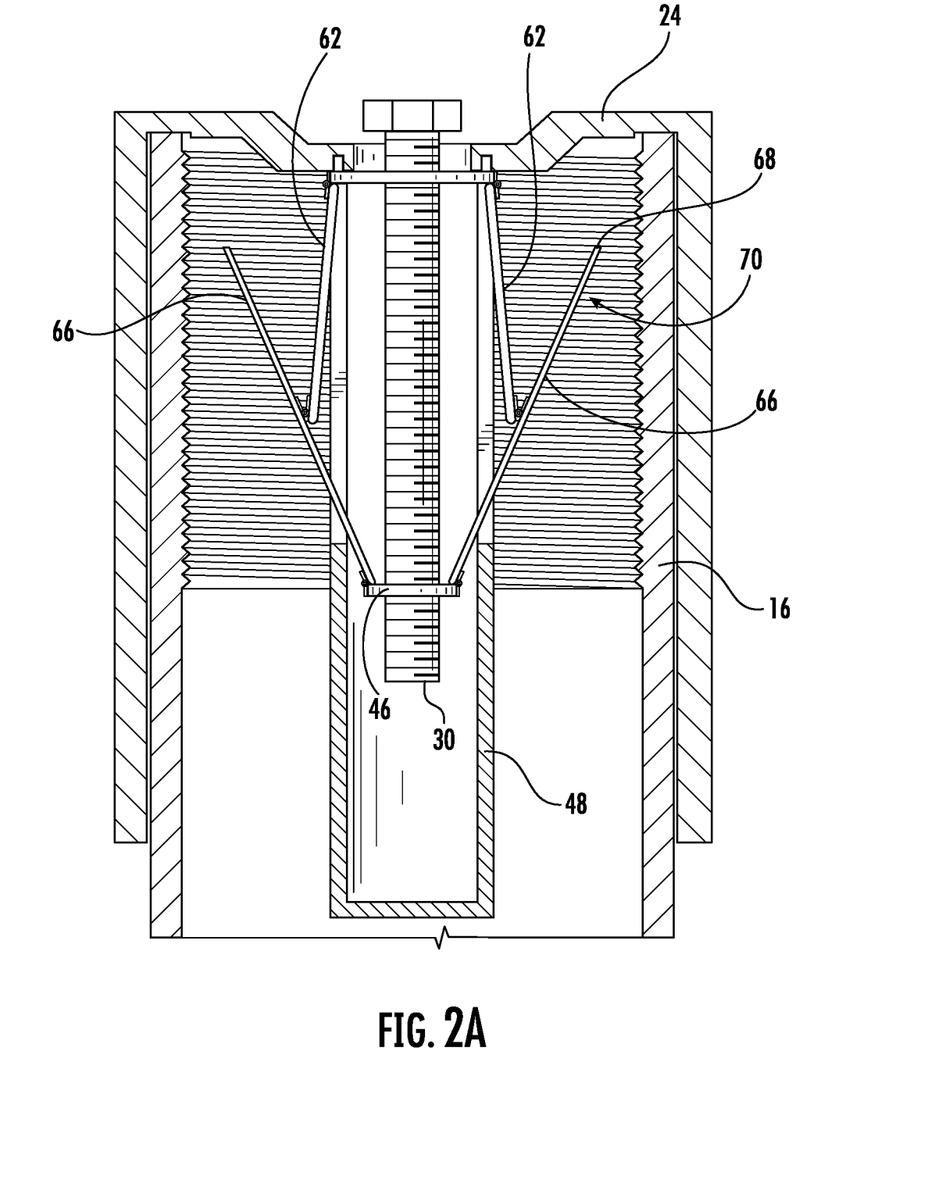
FIGS. 2A-2B show various views of another embodiment of the thread protector constructed in accordance with the present disclosure.
Figure 2B:
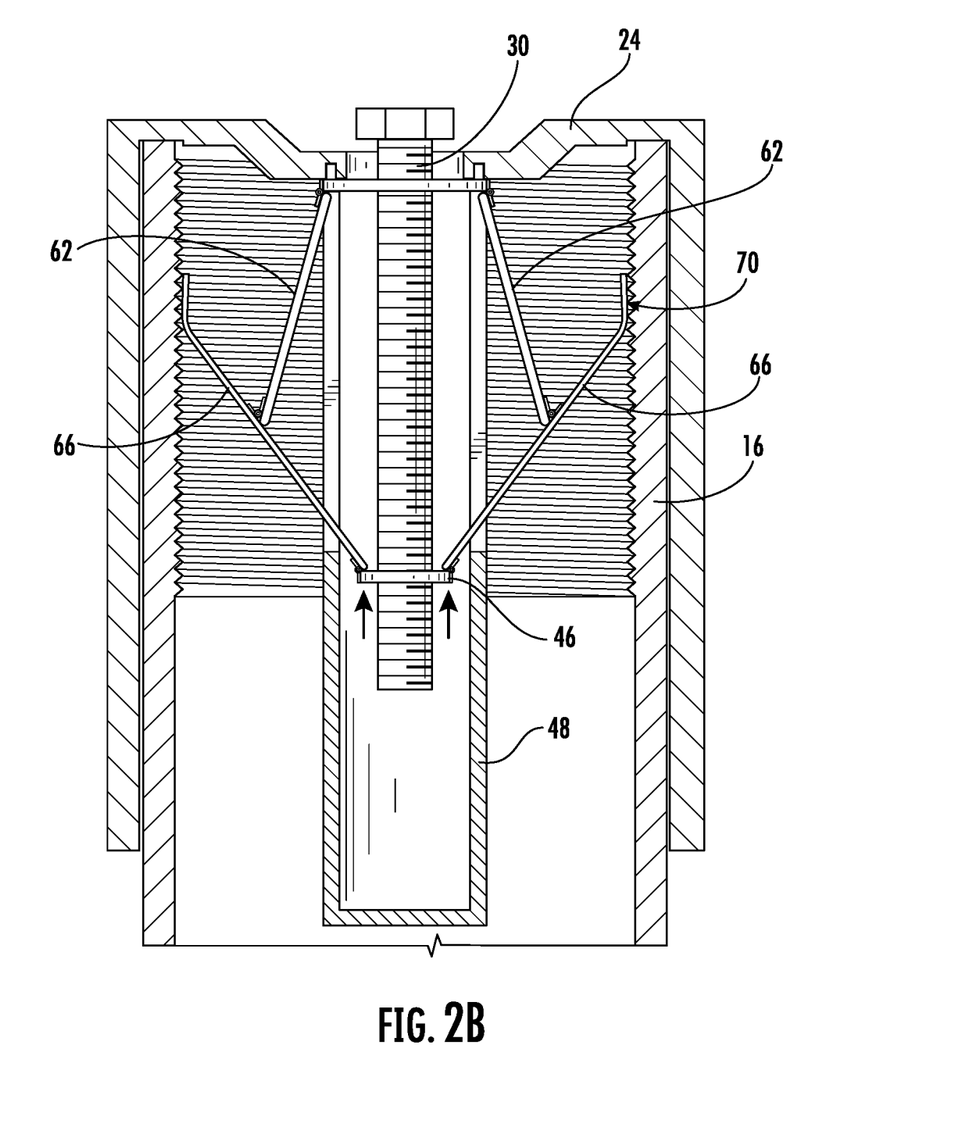

In another embodiment of the present disclosure shown in more detail in FIGS. 2A-2B, each leg assembly 44 can include a second leg portion 66 that is hingedly attached to the driving plate 46 on one end and hingedly attached to a part of the first leg portion 62 on the other end of the second leg portion 66. This relationship permits a terminal end 68 of each second leg portion 66 to engage with and be forced into the internal side 18 of the tubular member 16 to maintain engagement of the thread protector 10 with the tubular member 16. In this embodiment, when the bolt 30 is turned such that the driving plate 46 is moved outward from the inside of the tubular member 16 in an axial direction, the terminal ends 68 of the second leg portions 66 are moved outwardly toward the internal side 18 of the tubular member 16. With enough turns of the driving plate 46, the second leg portions 66 will flex due to the engagement with the internal side 18 of the tubular member 16 and outer sides 70 of the second leg portions 66 will be forced to engage with the internal side 18 of the tubular member 16.

Figure 3A:
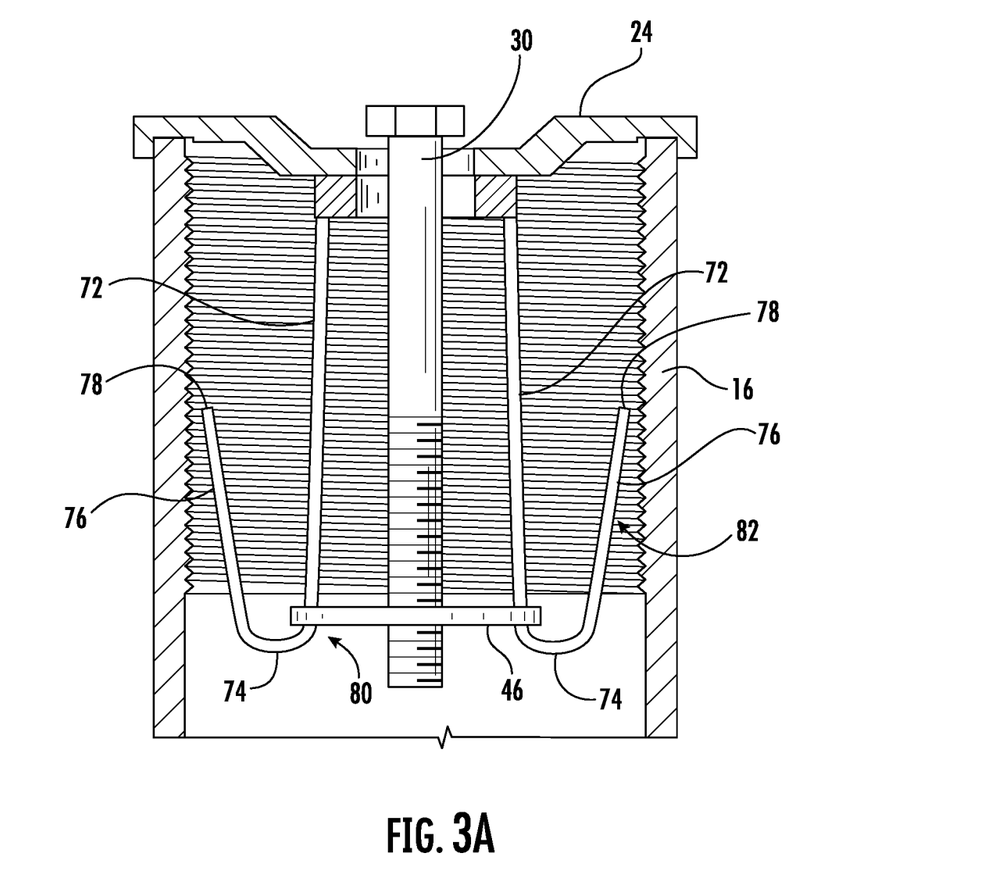
FIGS. 3A-3B show various views of yet another embodiment of the thread protector constructed in accordance with the present disclosure.
Figure 3B:
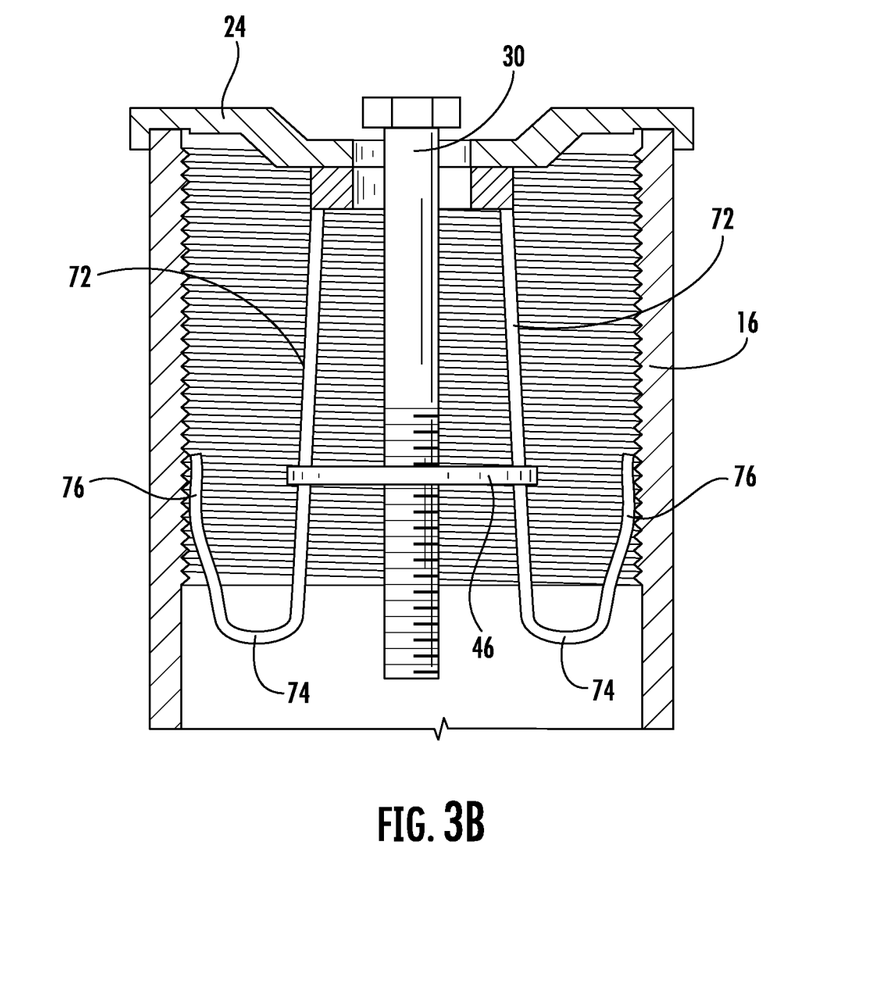

In yet another embodiment shown in more detail in FIGS. 3A and 3B, each first leg portion 62 can have a U-shape or V-shape having a down leg 72 extending from the plate 60 of the inner sleeve 48 (or in the alternative, the end cap 24) to a transition portion 74 positioned between the down leg 72 and an up leg 76 that extends back toward the end cap 24 and outward (in a radial direction) from the transition portion 74. Each first leg portion 62 can include a terminal end 78 on the opposite end of the up leg 76 from the transition portion 74 that can engages the internal side 18 of the tubular member 16 when the thread protector 10 is securably engaged with the tubular member 16. Each down leg 72 extends through an outer opening 80 disposed in the driving plate 46 wherein the outer openings 80 disposed in the driving plate 46 are wider (in a radial direction) than where the down legs 72 are hingedly attached to the plate 60 of the inner sleeve 48 (or in the alternative, the end cap 24). The outer openings 80 disposed wider than where the down legs 72 are attached allows for the terminal ends 78 of the up legs 76 to be forced outwards (in a radial direction) as the driving plate 46 is moved outwards (in an axial direction) or towards the end cap 24. This forced outward movement of the terminal ends 78 causes the terminal ends 78 to engage with the internal side 18 of the tubular member 16 and secure the thread protector 10 to the tubular member 16. When the terminal ends 78 are forced into the internal side 18 of the tubular member 16 to a certain extent, a portion of the outside surface 82 of the up leg 76 is forced into engagement with the internal side 18 of the tubular member 16 to further secure the thread protector 10 to the tubular member 16.

In one embodiment, the end cap 24 can be solid (or without openings) aside from the bolt opening 28. In another embodiment, the end cap 24 of the thread protector 10 can have openings 84 disposed therein wherein the end cap 24 includes cross bars 86 that connect an outer ring 88 to an inner ring 90 wherein the inner ring 90 includes the bolt opening 28 described herein. The openings 84 in the end cap 24 allow for visual inspection of the inside of the tubular member 16. The end cap 24 can also include a circumferential groove 92 disposed on one side to permit the end 94 of the sidewall 96 of the tubular member to be set therein to reduce lateral movement of the thread protector 10 on the tubular member 16.

Figure 4A:
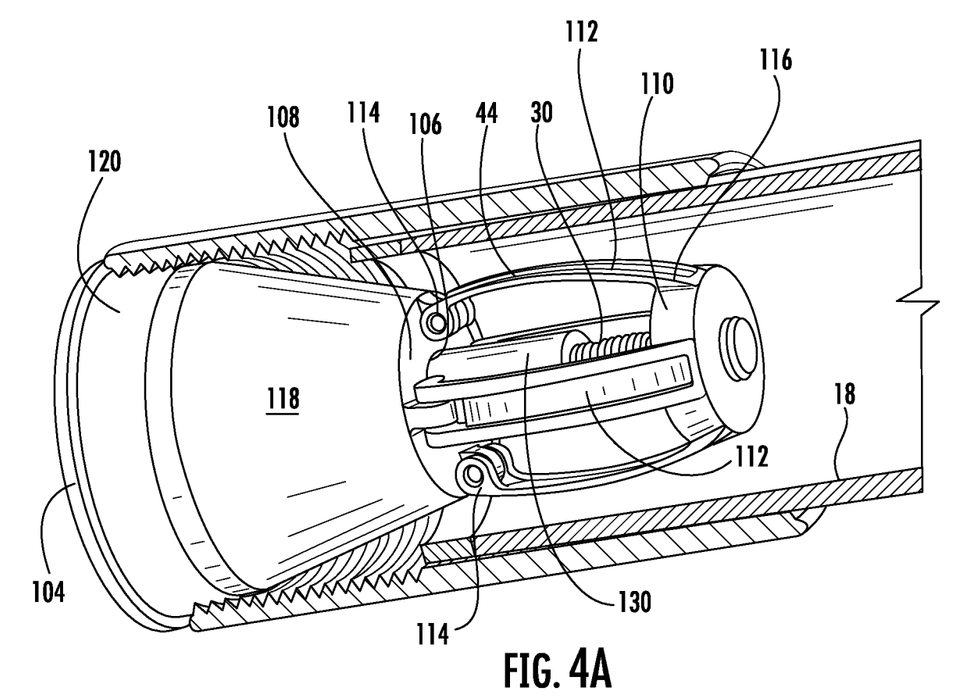
FIGS. 4A-4C show various views of a further embodiment of the thread protector constructed in accordance with the present disclosure.
Figure 4B:
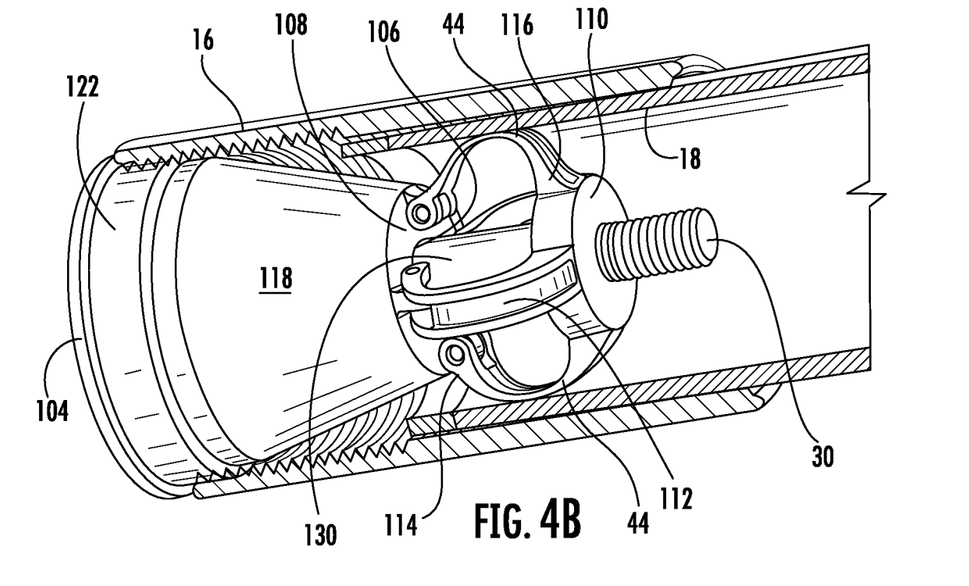
Figure 4C:
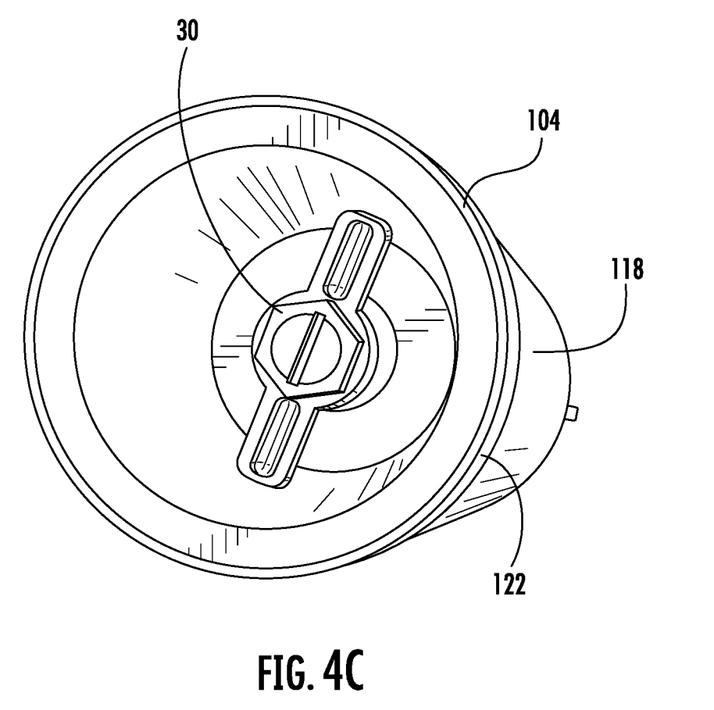
Figure 5A:
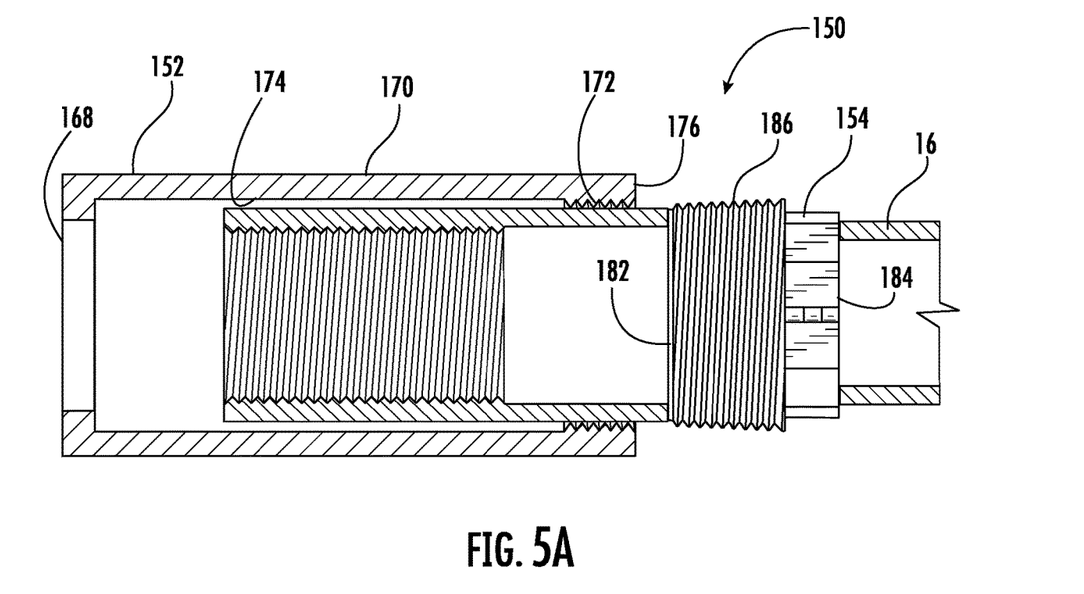
FIGS. 5A-5E show various views of an even further embodiment of a thread protector constructed in accordance with the present disclosure.
Figure 5B:
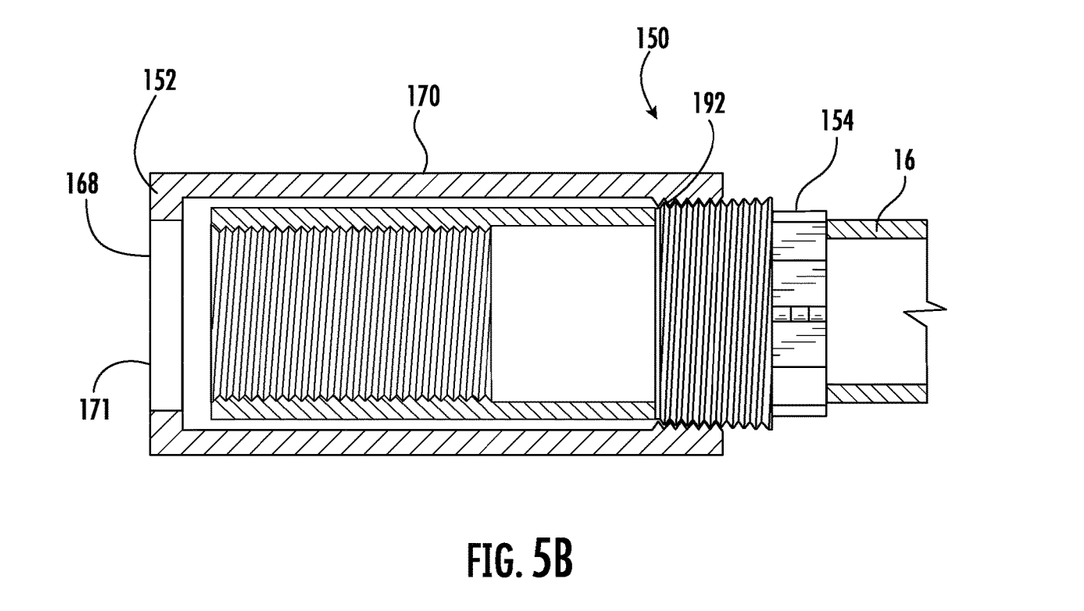
Figures 5C, 5D, 5E:
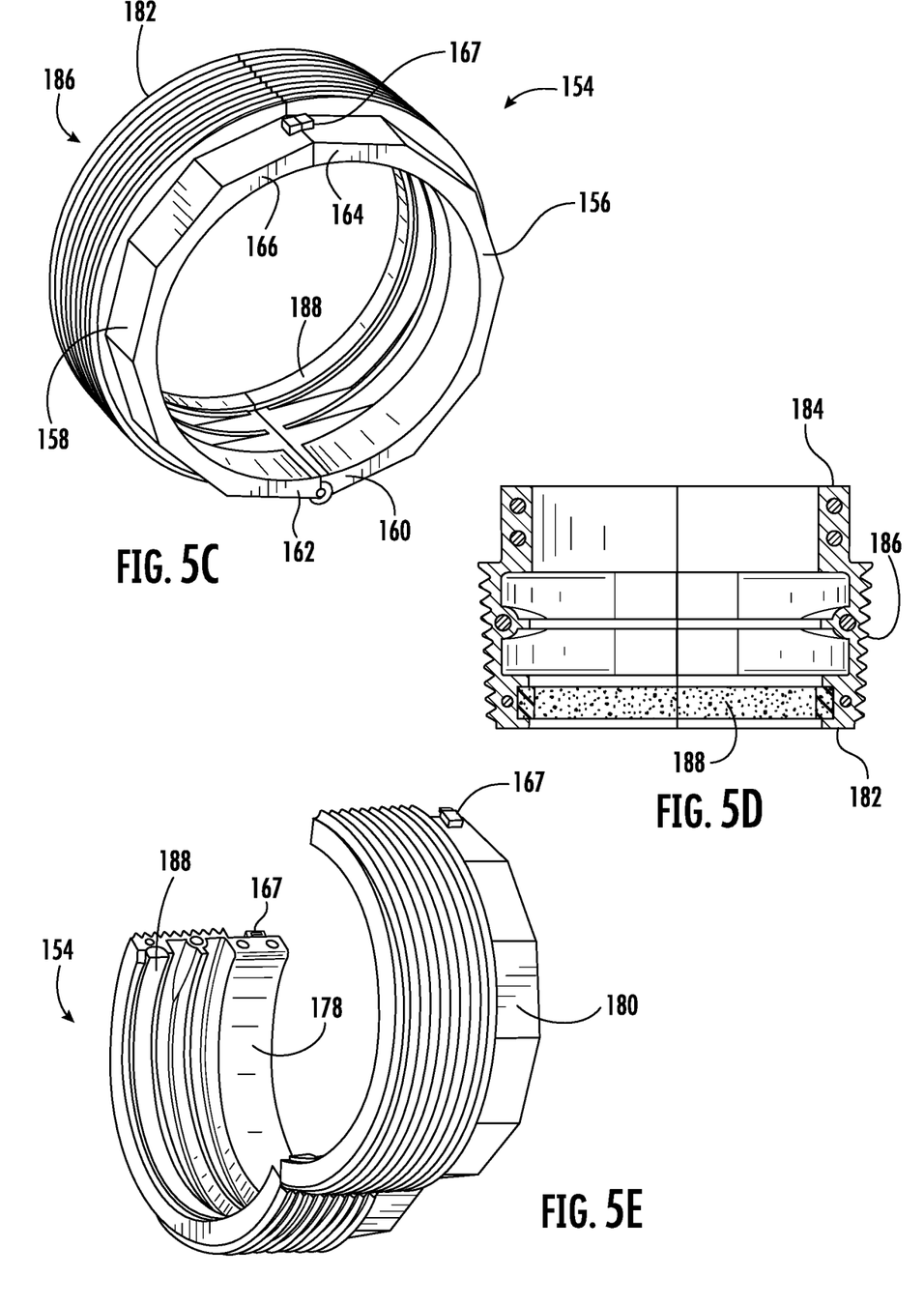

In a further embodiment of the present disclosure shown in more detail in FIGS. 4A-4C, the thread protector 10 includes an end cap 104 that can engage with the end 26 (pin end 14 or box end 15) of the tubular member 16. The end cap 104 can have a bolt opening 106 for receiving the bolt 30 that can engage with the securing apparatus 32 that can extend inside the tubular member 16 from the end cap 104. In one embodiment, the thread protector 10 can also include the external sleeve 34 that extends from the end cap 104 to protect the threads 12 on the pin end 14 of the tubular member 16. The external sleeve 34 can be sized to fit around the external side 20 of the tubular member 16 and have a length that is at least as long as the length of the threads 12 disposed on the pin end 14 of the tubular member 16. The external sleeve 34 is not needed for box ends 15 of tubular members 16 because the threads are on the inside.

In one embodiment, the securing apparatus 32 can include a plurality of leg assemblies 44 that extend from a bottom side 108 of the end cap 104 to engage the internal side 18 of the tubular member 16 and a driving ring 110 that is threadedly engaged with the bolt 30. The leg assemblies 44 are also operationally linked to the driving ring 110 so that the leg assemblies 44 are moved when the driving ring 110 is moved. The driving ring 110 is moved toward and away from the end cap 104 depending on the direction the bolt 30 is turned. The securing apparatus 32 can be designed such that the leg assemblies 44 can engage the internal side 18 of the tubular member 16 when the driving plate 46 is moved toward the end cap 104. The driving ring 110 can have any shape (e.g., round, square, etc.) such that it can engage with the leg assemblies 44 in the desired manner.

The leg assemblies 44 are sized such that they are bowed outward when the driving ring 110 is threaded on the bolt 30. As the bolt is turned and the driving ring 110 is moved in the direction of the end cap 104, the leg assemblies 44 are bowed more, which forces an outside surface 112 of the leg assemblies to engage with the internal side 18 of the tubular member 16 to secure the thread protector in place. In one embodiment, a first end 114 of the leg assemblies 44 can be hingedly attached to the bottom side 108 of the end cap 104 and/or a second side 116 of the leg assemblies 44 can be hingedly attached to the driving ring 110. The leg assemblies 44 can also be designed wherein they are not hingedly attached to the bottom side 108 of the end cap 104 or to the driving ring 110. The thread protector 10 can include two, three, four or more leg assembles 44 depending on the size of the thread protector 10.

The end cap 104 of the thread protector 10 shown in FIGS. 4A-4C can include a body 118 that extends from the bottom side 108 of the end cap 104 to a top part 120 of the end cap 104. A gasket 122 can be disposed around the body 118 of the end cap 104 adjacent to the top part 120. The gasket 122 can engage the internal side 18 of the tubular member 16. The gasket 122 can engage the internal threads 22 if it is the box end 15 of the tubular member 16. The end cap 104 can also include a recessed area 124 disposed in the top part 120 of the end cap 104. The recessed area 14 can encompass a bolt head 126 of the bolt 30. The bolt head 126 can include a handle 128 attached thereto for ease of turning the bolt 30 without the need for a wrench, or some other tool. The thread protector 10 in this embodiment can also include a torque sleeve 130 disposed around the bolt 30 and between the driving ring 110 and the bottom side 108 of the end cap 104. The torque sleeve 130 is designed to have a specific length such that when the bolt 30 is turned and the driving ring 110 is forced in the direction of the end cap 104, the driving ring 110 can only travel so far. The limited travel of the driving ring 110 by the torque sleeve 130 prevents the leg assemblies 44 from being driven too hard into the internal side 18 of the tubular member 16. In other words, the torque sleeve 130 provides a limit to the amount of torque that can be applied to the bolt 30 and thus, the leg assemblies 44.

Referring now to FIGS. 5A-5E, shown therein is another embodiment of a thread protector 150. The thread protector 150 includes a cup end 152 disposable on the end 26 of the tubular member 16 and a releasable sleeve 154 for engaging the cup end 152 and securing the thread protector 150 on the tubular member 16 to protect the threads on the inside or outside of the tubular member 16. The releasable sleeve 154 can have a first part 156 hingedly attached to a second part 158 on a first end 160, 162 of each part 156 and 158, respectively. A second end 164, 166 of each part 156 and 158 of the releasable sleeve 154, respectively, can be releasably attached around the tubular member 16 to create the releasable sleeve 154. The second ends 164 and 166 of the first and second parts 156 and 158 of the releasable sleeve 154 can be securely attached via a clasping mechanism 167. The clasping mechanism 167 can be designed in any manner known in the art, such as a clasp, a snap fitting, etc.

The cup end 152 can include an end plate 168 for engagement with the end 26 of the pin end 14 or the box end 15 of the tubular member 16 and a protective sleeve 170 extending therefrom. When the thread protector 150 is used on the pin end 14 of the tubular member 16, the protective sleeve 170 prevents damage from occurring to the threads. The end plate 168 of the cup end 152 can be a solid piece or it can have an opening 171 therein so that inspection of the inside of the tubular member 16 can be done. The opening 171 in the end plate 168 can be as large as the inside diameter of the tubular member 16 the thread protector 150 is used on. The protective sleeve 170 can have threads 172 disposed on an inside portion 174 adjacent to a terminal end 176 of the protective sleeve 170. The threads 172 can engage with the releasable sleeve 154 to hold the thread protector 150 in place on the tubular member 16.

The releasable sleeve 154 has an inner side 178, an outer side 180, a first end 182 for being inserted into the protective sleeve 170 and a second end 184. The outer side 180 can include threads 186 disposed thereon for engaging with the threads 172 disposed on the inside of the protective sleeve 170. The outer side 180 of the releasable sleeve 154 (when in the closed position) can have a diameter that increases from the first end 182 to the second end 184 of the releasable sleeve 154. The increasing diameter causes the inner side 178 of the releasable sleeve 154 to be forced into the tubular member since the releasable sleeve 154 is made of a softer and more flexible material. The increasing diameter of the outer side 180 of the releasable sleeve 154 also makes it where a cup end 152 can fit multiple sized tubular members 16. A sealing member 188 can be disposed on the inner side 178 of the releasable sleeve 154 to prevent moisture and debris from getting inside the thread protector 150 and thus, get to the threads of the tubular member. The sealing member 188 can be made of any material and have any size and shape such that it prevents water and debris from getting inside the thread protector 150. The sealing member 188 can also be sized and shaped such that the sealing member 188 has to be compressed in a radial direction when the releasable sleeve 154 is on the tubular member 16. The compression of the sealing member 188 can be what maintains the thread protector 150 in the desired location on the tubular member 16.

The releasable sleeve 154 can also be sized such that when the releasable sleeve 154 is disposed around the tubular member 16, the releasable sleeve 154 is securely disposed around the tubular member 16 such that it requires a certain amount of force to move it in the axial direction or rotate it around the tubular member 16. The releasable sleeve 154 can be positioned on the tubular member and the cup end 152 can be threaded onto the releasable sleeve 154 or the cup end 152 can be positioned on the tubular member 16 and the releasable sleeve 154 can be forced into engagement and threaded into the cup end 152.

In a further embodiment of the present disclosure, the cup end 152 can include an inner sleeve 190 that extends from the end plate 168. When the thread protector 150 is in place, the inner sleeve 190 extends into the tubular member 16 to protect the threads on the inside of the box end 15 of the tubular member 16. Where the threads end on the inside of the box end 15, a shoulder 192 is created. The inner sleeve 190 can be designed such that the inner sleeve 190 abuts the shoulder 192 when the thread protector 150 is securely in place on the tubular member 16.

In yet another embodiment, the box end 15 of a tubular member 16 can have a collar 194 extending around that creates an outer shoulder 196 on the external side 20 of the tubular member 16. When this outer shoulder 196 is present, the releasable sleeve 154 can abut the outer shoulder 196, which prevents movement of the releasable sleeve 154 toward the end 26 of the tubular member 16 when the cup end 152 is threadably engaged with the releasable sleeve 154.

The present disclosure is also directed toward a method of removing the thread protectors 10 from the tubular members 16 and using the tubular members 16 in various oil and gas operations. The method is also directed towards securing the thread protectors 10 to the tubular members 16 that are being used in the oil and gas operations.

From the above description, it is clear that the present disclosure is well-adapted to carry out the objectives and to attain the advantages mentioned herein as well as those inherent in the disclosure. While present embodiments have been described herein, it will be understood that numerous changes may be made which will readily suggest themselves to those skilled in the art and which are accomplished within the spirit of the disclosure and claims. Any elements of any embodiments disclosed herein can be combined with any of the other embodiments disclosed herein.

What is claimed is:

1. A thread protector, the thread protector comprising:
    an end cap for engaging with a pin end or box end of a tubular member, the end cap having a body portion that extends from the end cap into the tubular member;
    a securing apparatus extending from the end cap to frictionally engage an inner side of the tubular member to maintain the thread protector's engagement with the tubular member, the securing apparatus includes a plurality of leg assemblies to engage the inside of the tubular member;
    a bolt extending through an opening in the end cap that actuates the leg assemblies when the bolt is turned;
    a driving plate threadably engaged with the bolt that transfers the turning motion of the bolt to movement of the leg assemblies; and
    a torque sleeve disposed around the bolt and between the body of the end cap and the driving plate to limit the amount of travel of the driving plate towards the end cap and prevent the leg assemblies from being driven into the inner side of the tubular member beyond a desired amount.

2. The thread protector of claim 1 further comprising an external sleeve extending from the end cap to protect thread disposed on the pin end of the tubular member.

3. The thread protector of claim 1 wherein each leg assembly includes a leg that is hingedly attached to the body portion of the end cap on one end and supported by the driving plate on the other end of the leg.

4. A method of protecting threads of pin ends of tubular members, the method comprising:
    installing a thread protector on a pin end or a box end of a tubular member to protect threads disposed on the pin end or the box end of the tubular member, the thread protector comprises:
        an end cap for engaging with a pin end or box end of a tubular member, the end cap having a body portion that extends from the end cap into the tubular member;
        a securing apparatus extending from the end cap to frictionally engage an inner side of the tubular member to maintain the thread protector's engagement with the tubular member, the securing apparatus includes a plurality of leg assemblies to engage the inside of the tubular member;
        a bolt extending through an opening in the end cap that actuates the leg assemblies when the bolt is turned;
        a driving plate threadably engaged with the bolt that transfers the turning motion of the bolt to movement of the leg assemblies; and
        a torque sleeve disposed around the bolt and between the body of the end cap and the driving plate to limit the amount of travel of the driving plate towards the end cap and prevent the leg assemblies from being driven into the inner side of the tubular member beyond a desired amount.

5. The method of claim 4 further comprising an external sleeve extending from the end cap to protect thread disposed on the pin end of the tubular member.

6. The method of claim 4 wherein each leg assembly includes a leg that is hingedly attached to the body portion of the end cap on one end and supported by the driving plate on the other end of the leg.

* * * * *